(12) United States Patent
Wang et al.

(10) Patent No.: US 10,911,356 B2
(45) Date of Patent: Feb. 2, 2021

(54) FORWARDING PACKET

(71) Applicant: NEW H3C TECHNOLOGIES CO., LTD., Hangzhou (CN)

(72) Inventors: Minghui Wang, Beijing (CN); Xiyuan Ma, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 85 days.

(21) Appl. No.: 16/329,133

(22) PCT Filed: Aug. 30, 2017

(86) PCT No.: PCT/CN2017/099643
§ 371 (c)(1),
(2) Date: Feb. 27, 2019

(87) PCT Pub. No.: WO2018/041135
PCT Pub. Date: Mar. 8, 2018

(65) Prior Publication Data
US 2019/0199631 A1 Jun. 27, 2019

(30) Foreign Application Priority Data

Aug. 30, 2016 (CN) .......................... 2016 1 0782252

(51) Int. Cl.
*H04L 12/741* (2013.01)
*H04L 12/46* (2006.01)
(Continued)

(52) U.S. Cl.
CPC .......... *H04L 45/74* (2013.01); *H04L 12/4641* (2013.01); *H04L 41/0803* (2013.01);
(Continued)

(58) Field of Classification Search
CPC ....... H04L 45/74; H04L 45/586; H04L 45/66; H04L 45/54; H04L 45/745;
(Continued)

(56) References Cited

U.S. PATENT DOCUMENTS 7,830,787 B1 * 11/2010 Wijnands ................ H04L 12/18
370/218
10,296,370 B2 * 5/2019 Gao ..................... H04L 12/4633
(Continued)

FOREIGN PATENT DOCUMENTS

| CN | 102123074 A | 7/2011 |
| CN | 102739501 A | 10/2012 |

(Continued)

OTHER PUBLICATIONS

ISA State Intellectual Property Office of the People's Republic of China, Written Opinion of the International Searching Authority Issued in Application No. PCT/CN2017/099643, dated Nov. 27, 2017, WIPO, 3 pages.
(Continued)

*Primary Examiner* — Stephen J Clawson
(74) *Attorney, Agent, or Firm* — McCoy Russell LLP

(57) ABSTRACT

A method for forwarding a packet and a switch are provided. The switch receives a packet via a port; when the packet is a layer-2 packet, determines a VSI based on an ID of a MDC to which the port belongs and an ID of a VLAN of the packet, searches for a layer-2 entry stored in a chip where the port is located and matching with the VSI and a destination MAC address of the packet, and forwards the packet based on the layer-2 entry; when the packet is a layer-3 packet, determines a second VRF based on the ID of the MDC and an ID of a first VRF to which the packet belongs, searches for a layer-3 entry stored in the chip and matching with the
(Continued)

second VRF and a destination IP address of the packet, and forwards the packet based on the layer-3 entry.

12 Claims, 5 Drawing Sheets

(51) Int. Cl.
*H04L 12/935* (2013.01)
*H04L 12/713* (2013.01)
*H04L 12/24* (2006.01)
*H04L 12/721* (2013.01)
*H04L 29/06* (2006.01)

(52) U.S. Cl.
CPC ............ *H04L 45/586* (2013.01); *H04L 45/66* (2013.01); *H04L 49/30* (2013.01); *H04L 49/3009* (2013.01); *H04L 63/101* (2013.01); *H04L 45/54* (2013.01); *H04L 45/745* (2013.01)

(58) Field of Classification Search
CPC . H04L 12/4641; H04L 12/0803; H04L 49/30; H04L 49/3009; H04L 63/101
See application file for complete search history.

(56) References Cited

U.S. PATENT DOCUMENTS

| | | | | |
|---|---|---|---|---|
| 10,367,733 | B2* | 7/2019 | Han | H04L 61/103 |
| 2005/0190757 | A1* | 9/2005 | Sajassi | H04L 45/586 |
| | | | | 370/389 |
| 2006/0171407 | A1* | 8/2006 | Kim | H04L 49/201 |
| | | | | 370/432 |
| 2010/0031253 | A1* | 2/2010 | Adams | G06F 9/455 |
| | | | | 718/1 |
| 2010/0309820 | A1* | 12/2010 | Rajagopalan | H04L 49/35 |
| | | | | 370/256 |
| 2011/0019556 | A1* | 1/2011 | Hsin | H04L 65/80 |
| | | | | 370/252 |
| 2012/0250695 | A1* | 10/2012 | Jia | H04L 41/0806 |
| | | | | 370/400 |
| 2014/0056298 | A1* | 2/2014 | Vobbilisetty | H04L 49/65 |
| | | | | 370/355 |
| 2014/0219289 | A1 | 8/2014 | Ye et al. | |
| 2014/0282523 | A1* | 9/2014 | Abidi | G06F 9/45533 |
| | | | | 718/1 |
| 2014/0321472 | A1* | 10/2014 | Jiang | H04L 12/4641 |
| | | | | 370/408 |
| 2015/0010001 | A1 | 1/2015 | Duda et al. | |
| 2015/0120966 | A1 | 4/2015 | Louzoun et al. | |
| 2015/0207664 | A1 | 7/2015 | Basso et al. | |
| 2015/0281073 | A1 | 10/2015 | Kotha et al. | |
| 2015/0341220 | A1* | 11/2015 | Sikand | H04L 41/084 |
| | | | | 370/255 |
| 2019/0273683 | A1* | 9/2019 | Jiang | H04L 12/4641 |

FOREIGN PATENT DOCUMENTS

| | | |
|---|---|---|
| CN | 103595639 A | 2/2014 |
| CN | 104579898 A | 4/2015 |
| CN | 105591925 A | 5/2016 |
| JP | 2011142479 A | 7/2011 |
| JP | 2015192399 A | 11/2015 |
| JP | 2016515346 A | 5/2016 |
| JP | 2019511763 A | 4/2019 |
| WO | 2014040569 A1 | 3/2014 |

OTHER PUBLICATIONS

State Intellectual Property Office of the People's Republic of China, Office Action and Search Report Issued in Application No. 201610782252.3, dated Apr. 3, 2019, 7 pages. (Submitted with Partial Translation).
European Patent Office, Extended European Search Report Issued in Application No. 17845437.7, dated Apr. 12, 2019, Germany, 9 pages.
ISA State Intellectual Property Office of the People's Republic of China, International Search Report Issued in Application No. PCT/CN2017/099643, dated Nov. 27, 2017, WIPO, 4 pages.
European Patent Office, Office Action Issued in Application No. 17845437.7, dated May 12, 2020, Germany, 3 pages.

* cited by examiner

FORWARDING PACKET

CROSS REFERENCE TO RELATED APPLICATION

This present application is a U.S. National Phase of International Patent Application Serial No. PCT/CN2017/099643 entitled "MESSAGE FORWARDING," filed on Aug. 30, 2017. International Patent Application Serial No. PCT/CN2017/099643 claims priority to Chinese Patent Application No. 201610782252.3 filed on Aug. 30, 2016. The entire contents of each of the above-cited applications are hereby incorporated by reference in their entirety for all purposes.

BACKGROUND

By using a virtualization technology, a physical device may be virtualized into a plurality of logical devices. Each logical device is generally called a Multitenant Devices Context (MDC) at present. Each MDC is provided with MDC configurations supporting its own operation, where the MDC configurations include hardware resources and software resources. The hardware resources include independent interfaces, a CPU, and the like, and the software resources include routing entries, forwarding entries, and the like. Each MDC has an independent start-up file and a configuration file, and thus can be created, run, rebooted and deleted without influencing other MDCs.

BRIEF DESCRIPTION OF THE DRAWINGS

The accompanying drawings, being incorporated into the description as a part of the description, illustrate examples of the present disclosure and explain the principles of the present disclosure.

DETAILED DESCRIPTION OF THE EMBODIMENTS

To illustrate the objectives, technical solutions and advantages of the present disclosure more clearly, the present disclosure will be described in detail below in combination with the drawings and examples.

In a virtual device environment, different MDCs may have mutually-conflicting MDC configurations. In order to prevent mutually-conflicting MDCs from being set on the same chip, in a switch of which the MDCs are virtualized based on chips, external ports of each chip belong to one MDC whose MDC configurations are set on this chip. However, MDC being virtualized by each chip may have limited application range.

According to a method provided in the present disclosure, MDCs may be virtualized based on ports, ports of a switch may be allocated to corresponding MDCs based on service demands. The method provided in the present disclosure will be described below with reference to FIG. 1.

Figure 1:
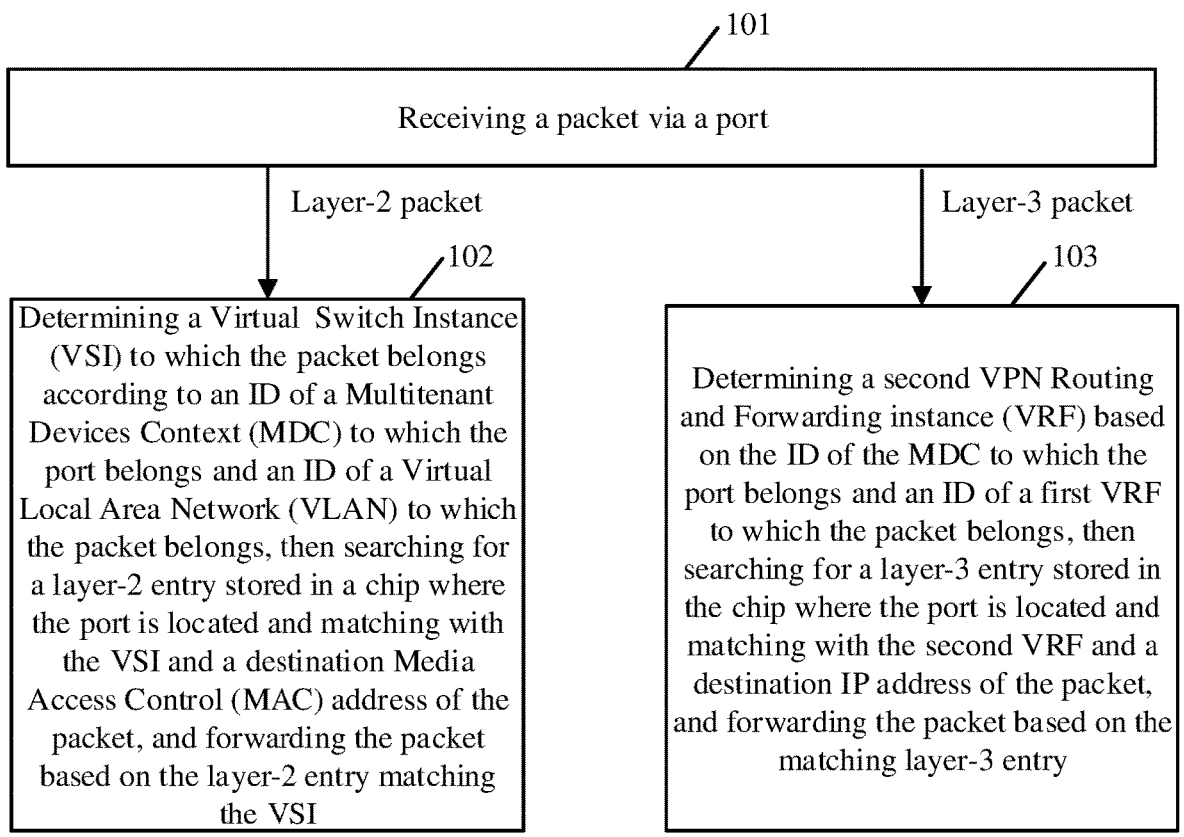
FIG. 1 illustrates a flowchart of a method of forwarding a packet based on the present disclosure.

FIG. 1 illustrates a flowchart of a method of forwarding a packet based on the present disclosure. The method is applied to a switch. As shown in FIG. 1, the method may include blocks as below.

At block 101, a packet is received via a port. Block 102 is executed when the packet is determined as a layer-2 packet. Block 103 is executed when the packet is determined as a layer-3 packet.

At block 102, a Virtual Switch Instance (VSI) to which the packet belongs is determined based on an identification (ID) of a Multitenant Devices Context (MDC) to which the port belongs and an ID of a Virtual Local Area Network (VLAN) to which the packet belongs, then a layer-2 entry matching the VSI and a destination Media Access Control (MAC) address of the packet is searched on a chip where the port is located, and the packet is forwarded based on the layer-2 entry matching the VSI.

At block 103, a second VPN Routing and Forwarding instance (hereinafter referred to as VRF) is determined based on the ID of the MDC to which the port belongs and an ID of a first VRF to which the packet belongs, then a layer-3 entry matching the second VRF and a destination Internet Protocol (IP) address of the packet is searched on the chip where the port is located, and the packet is then forwarded based on the matching layer-3 entry.

It may be seen from the flow shown in FIG. 1, the MDC on which the port is located is involved in the matching field of the layer-2 entry and the matching field of the layer-3 entry. It means that in the configurations of the MDC, both layer-2 entry and a layer-3 entry relate to the MDC. The configurations of the MDC virtualized based on ports may conflict to configurations of another MDC virtualized based on ports.

The flow shown in FIG. 1 will be described below with examples.

Figure 2:
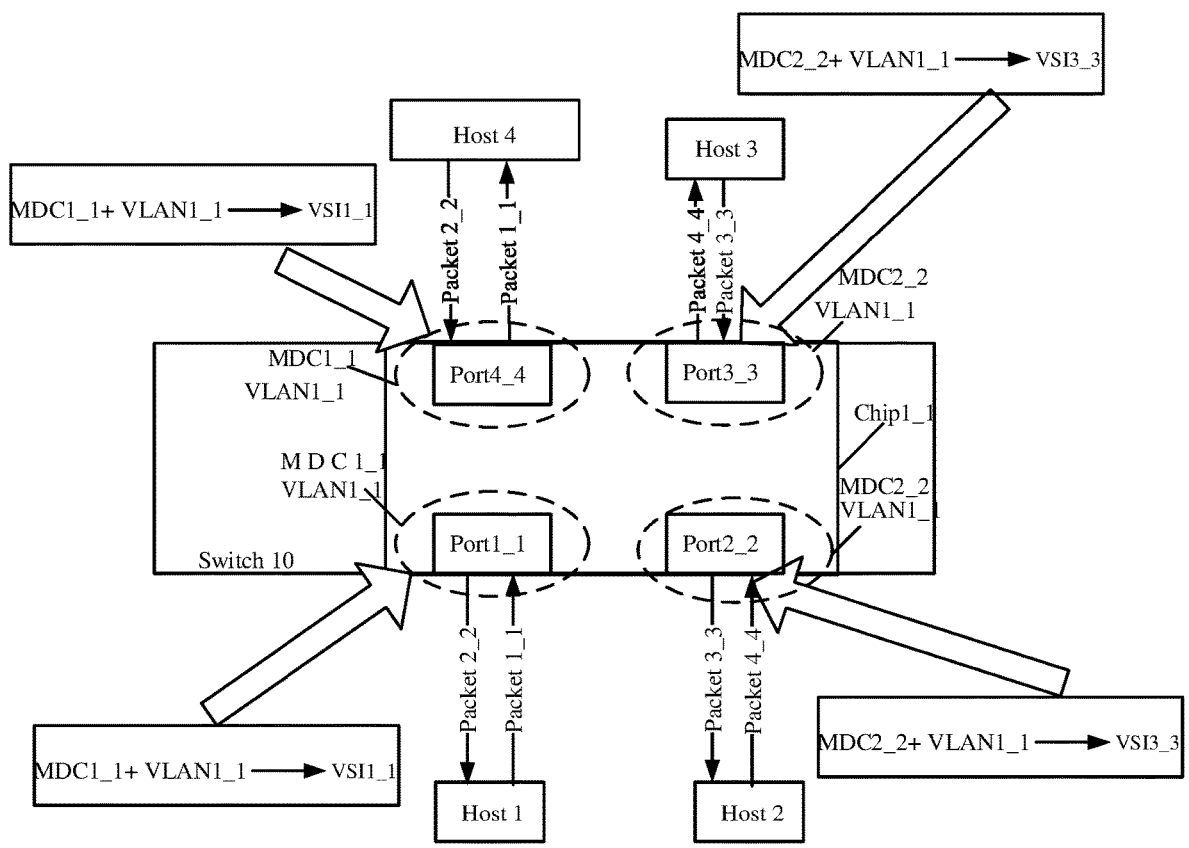
FIG. 2 illustrates a schematic diagram of implementation of one example based on the present disclosure.

FIG. 2 illustrates a schematic diagram of implementation of one example based on the present disclosure. In FIG. 2, on a switch 10, a port connecting host 1 is denoted as Port1_1, a port connecting host 2 is denoted as Port2_2, a port connecting host 3 is denoted as Port3_3 and a port connecting host 4 is denoted as Port4_4. The ports Port1_1, Port2_2, Port3_3 and Port4_4 locate on the same chip Chip1_1. Port1_1 and Port4_4 belong to MDC1_1, and Port2_2 and Port3_3 belong to MDC2_2.

In FIG. 2, Port1_1, Port2_2, Port3_3 and Port4_4 all belong to a VLAN1_1.

For example, the host 1 accesses the host 4 through a layer-2.

As shown in FIG. 2, the switch 10 receives a packet 1_1 which is the layer-2 packet (a data link layer) via the Port1_1. A source MAC address and a destination MAC address of the packet 1_1 are respectively the MAC address MAC1_1 of the host 1 and an MAC address MAC4_4 of the host 4.

The MDC1_1 to which the Port1_1 belongs and the VLAN1_1 to which the Port1_1 belongs are mapped to a VSI by the switch 10. Based on the manner by which MDCs are virtualized based on ports in the example illustrated in FIG. 2, at least two ports such as Port1_1 and Port2_2 on one chip belong to different MDCs, but belong to the same VLAN. In this case, in accordance with the existing manner by which MDCs are virtualized based on chips, a one-to-one correspondence between a VLAN ID and a VSI is set, this correspondence may result in that different MDCs correspond to the same VSI and layer-2 packets which are in the same VLAN and to be forwarded separately by different MDCs may be forwarded across MDCs. In order to avoid that layer-2 packets which are in the same VLAN and to be forwarded separately by different MDCs may be forwarded across MDCs, an MDC ID and a VLAN ID are mapped to a VSI based on the example illustrated in FIG. 2. By mapping an MDC ID and a VLAN ID to a VSI, a mapping relationship being specifically expressed as: MDC ID+VLAN ID→VSI ID is set. The MDC1_1 to which the Port1_1 belongs and the VLAN1_1 to which the Port1_1 belongs are mapped to a VSI based on the mapping relationship. By the mapping relationship which maps the MDC ID and the VLAN ID to the VSI, the layer-2 packets which are in the same VLAN and to be forwarded separately by different MDCs may not be forwarded across MDCs, thus layer-2 ports of one MDC may be isolated from layer-2 ports on another MDC.

For convenience of description, the VSI to which the MDC1_1 and the VLAN1_1 are mapped is denoted as VSI1_1 herein.

The switch 10 searches for a layer-2 entry which is stored by the Chip 1_1 and matches the VSI1_1 and the destination MAC address MAC4_4 of the packet 1_1. As an example, the layer-2 entry herein includes but not limited to an MAC entry and the like. For convenience of description, the layer-2 entry matching the VSI1_1 and the destination MAC address MAC4_4 of the packet 1_1 is denoted as entry 1_1 herein. Table 1 illustrates the entry 1_1 for example.

TABLE 1

| VSI1_1 | MAC4_4 | Port4_4 |
|---|---|---|

When the entry 1_1 is found on the Chip1_1, the packet 1_1 is forwarded via the Port4_4 recorded in the entry 1_1. The packet 1_1 eventually arrives at the host 4, realizing that the host 1 accesses to the host 4.

When none of layer-2 entries stored in the Chip1_1 matches with the source MAC address MAC1_1 of the packet 1_1 and the VSI1_1, the layer-2 entry matching the MAC1_1 and the VSI1_1 is to be learned based on the port Port1_1 receiving the packet 1_1 and the source MAC address MAC1_1 of the packet 1_1. For convenience of description, the layer-2 entry matching the VSI1_1 and the source MAC address MAC1_1 of the packet 1_1 is denoted as entry 2_2 herein. Table 2 illustrates the entry 2_2 for example.

TABLE 2

| VSI1_1 | MAC1_1 | Port1_1 |
|---|---|---|

When the host 4 is to accesses to the host 1 through the layer-2, the switch 10 receives a layer-2 (the data link layer) packet 2_2 via the Port4_4. A source MAC address and a destination MAC address of the packet 2_2 are respectively the MAC address MAC4_4 of the host 4 and the MAC address MAC1_1 of the host 1.

The MDC1_1 to which the Port4_4 belongs and the VLAN1_1 to which the Port4_4 belongs are mapped to a VSI by the switch 10. The mapped VSI is the above-mentioned VSI1_1.

The switch 10 searches for a layer-2 entry which is stored on the Chip1_1 and matches the VSI1_1 and the destination MAC address MAC1_1 of the packet 2_2. The layer-2 entry is the above-mentioned entry 2_2.

The switch 10 forwards the packet 2_2 via the Port1_1 recorded in the entry 2_2. The packet 2_2 eventually arrives at the host 1, realizing that the host 4 accesses to the host 1.

The above is the description of the mutual accessing between the host 4 and the host 1 through the layer-2.

The host 3 accessing the host 2 is now taken for another example.

As shown in FIG. 2, the switch 10 receives a layer-2 (the data link layer) packet 3_3 via the Port3_3. A source MAC address and a destination MAC address of the packet 3_3 are respectively the MAC address MAC3_3 of the host 3 and the MAC address MAC2_2 of the host 2.

The MDC2_2 to which the Port3_3 belongs and the VLAN1_1 to which the Port3_3 belongs are mapped to a VSI by the switch 10. For convenience of description, the VSI to which the MDC2_2 and the VLAN1_1 are mapped is denoted as VSI3_3 herein.

The switch 10 searches for a layer-2 entry which is stored in the Chip1_1 and matches the VSI3_3 and a destination MAC address MAC2_2 of the packet 3_3. For convenience of description, the layer-2 entry matching the VSI3_3 and the destination MAC address MAC2_2 of the packet 3_3 is denoted as entry 3_3 herein.

Table 3 illustrates the entry 3_3 for example.

TABLE 3

| VSI3_3 | MAC2_2 | Port2_2 |
|---|---|---|

When the entry 3_3 is found in the Chip1_1, the packet 3_3 is forwarded via the Port2_2 in the entry 3_3. The packet 3_3 eventually arrives at the host 2, the host 3 accesses to the host 2.

When none of layer-2 entries stored in the Chip1_1 matches with the source MAC address MAC3_3 of the packet 3_3 and the VSI3_3, the layer-2 entry matching the MAC3_3 and the VSI3_3 is to be learned based on the port Port3_3 receiving the packet 3_3 and the source MAC address MAC3_3 of the packet 3_3. For convenience of description, the layer-2 entry matching the VSI3_3 and the source MAC address MAC3_3 of the packet 3_3 is denoted as entry 4_4 herein.

Table 4 illustrates the entry 4_4 for example.

TABLE 4

| VSI3_3 | MAC3_3 | Port3_3 |
|---|---|---|

Then, when the host 2 is to access to the host 3, the switch 10 receives a layer-2 (the data link layer) packet 4_4 via the Port2_2. A source MAC address and a destination MAC address of the packet 4_4 are respectively the MAC address MAC2_2 of the host 2 and the MAC address MAC4_4 of the host 4.

The MDC2_2 to which the Port2_2 belongs and the VLAN1_1 to which the Port2_2 belongs are mapped to a VSI by the switch 10. The mapped VSI is the above-mentioned VSI3_3.

The switch 10 searches a layer-2 entry which is stored in the Chip 1_1 and matches the VSI3_3 and the destination MAC address MAC3_3 of the packet 4_4. The layer-2 entry is the above-mentioned entry 4_4.

The switch 10 forwards the packet 4_4 via the Port3_3 of the entry 4_4, and the packet 4_4 eventually arrives at the host 3, realizing that the host 2 accesses the host 3.

In the above description, both the entry 1_1 and the entry 2_2 are the MDC configurations of the MDC1_1. Both the entry 3_3 and the entry 4_4 are the MDC configurations of the MDC2_2. With the entry 2_2 and the entry 4_4 as an example, it is found, by comparing the entry 2_2 with the entry 4_4, that the learned layer-2 entries are different because the Port1_1 and the Port3_3 belong to different MDCs even though the Port1_1 and the Port3_3 belong to the VLAN1_1. This may also ensure that the MDC configurations of different MDCs on the same chip do not conflict with each other, and the layer-2 packets which are in the same VLAN and to be forwarded separately by different MDCs may not be forwarded across MDCs.

Figure 3:
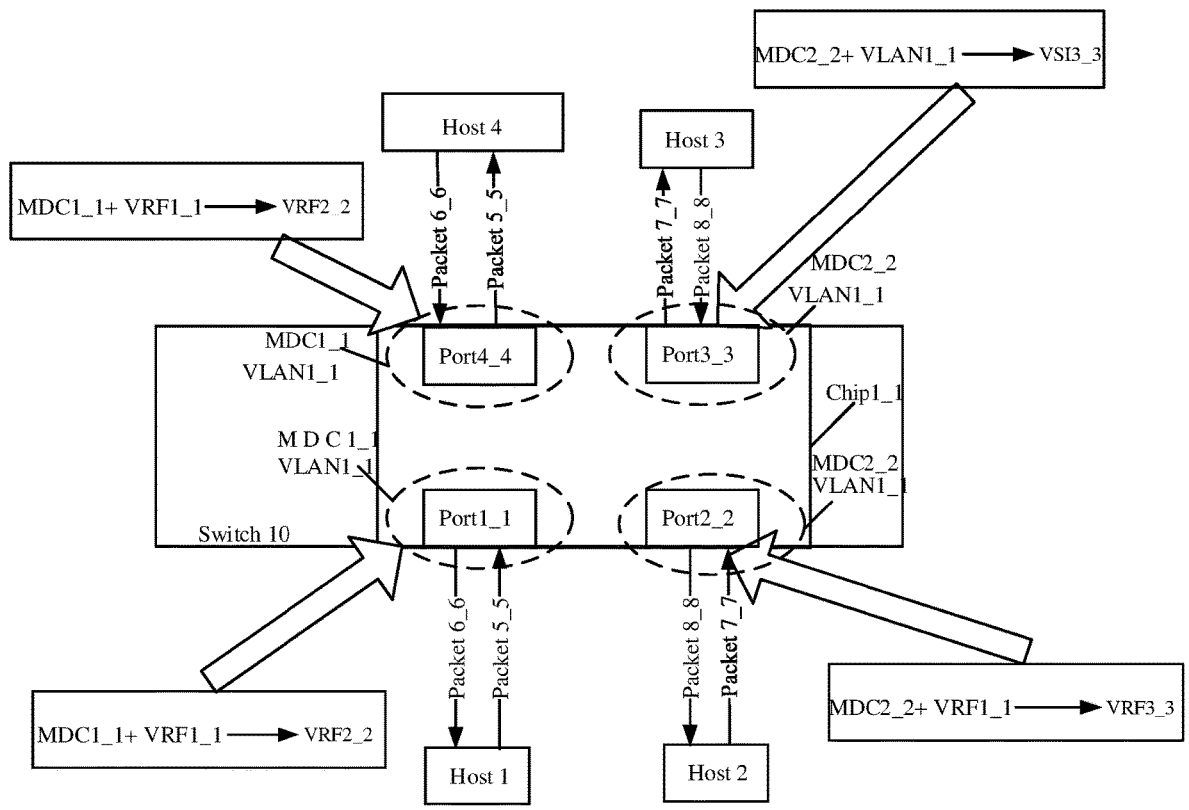
FIG. 3 illustrates a schematic diagram of implementation of another example based on the present disclosure.

FIG. 3 illustrates a schematic diagram of implementation of another example based on the present disclosure. In FIG. 3, the ports Port1_1, Port2_2, Port3_3 and Port4_4 of the switch 10 locate on the same chip Chip1_1. Port1_1 and Port4_4 belong to the MDC1_1, and Port2_2 and Port3_3 belong to an MDC1_2.

In FIG. 3, Port1_1, Port2_2, Port3_3 and Port4_4 all belong to the VLAN1_1.

For example, The host 1 is to access to the host 4 through a layer-3.

As shown in FIG. 3, the switch 10 receives a layer-3 (a network layer) packet 5_5 via the Port1_1. The packet 5_5 is sent from the host 1 to the host 4, a source IP address and a destination IP address of the packet5_5 are IP1_1 and IP4_4 respectively.

The MAC 1 to which the Port1_1 belongs and a VRF1_1 to which the packet 5_5 belongs are mapped to a VRF by the switch 10. By mapping the MDC ID and the VRF ID to a new VRF ID, a mapping relationship being specifically expressed as: MDC ID+VRF ID→VRF ID' is preset. The layer-3 packets, belonging to the same VRF and to be forwarded separately by different MDCs, can be identified by the chip based on entries mapped to different new VRFs, and may not be forwarded across MDCs.

For convenience of description, the new VRF to which the MDC1_1 and the VRF1_1 are mapped is denoted as VRF2_2.

The switch 10 finds the layer-3 entry which is stored in the chip and matches the VRF2_2 and the destination IP address IP4_4 of the packet. As an example, the layer-3 entry herein includes but not limited to a unicast routing entry, a multicast routing entry, an ARP entry, an MPLS entry, and the like. For convenience of description, the layer-3 entry, matching the VRF2_2 and the destination IP address IP4_4 of the packet, is denoted as entry 5_5 herein.

When the entry 5_5 is found in the Chip1_1, the packet 5_5 is forwarded directly based on the entry 5_5. The packet 5_5 will be eventually forwarded to the host 4.

When none of layer-3 entries stored in the Chip1_1 matches with a source IP address IP1_1 of the packet 5_5 and the VRF2_2, a layer-3 entry, of which matching field includes the source IP address IP1_1 of the packet 5_5 and the VRF2_2, is learned based on the Port1_1 receiving the packet 5_5 and the source IP address IP1_1 of the packet 5_5. For convenience of description, the layer-3 entry matching the IP1_1 and the VRF2_2 is denoted as entry 6_6 herein. Table 5 illustrates the entry 6_6 by exemplifying the layer-3 entry as a unicast routing entry.

TABLE 5

| VRF2_2 | IP1_1 | Port1_1 |
| --- | --- | --- |

When the host 4 is to access to the host 1 through the layer-3, the switch receives a layer-3 packet 6_6 via the Port4_4. The packet 6_6 is sent from the host 4 to the host 1, a source IP address and a destination IP address of the packet 6_6 are IP4_4 and IP1_1 respectively.

The MDC1_1 to which the Port4_4 belongs and the VRF1_1 to which the packet 6_6 belongs are mapped to a new VRF by the switch 10. The mapped new VRF is the above-mentioned VRF2_2.

The switch 10 searches for a layer-3 entry which is stored in the Chip1_1 and matches the VRF2_2 and the destination IP address IP1_1 of the packet. The layer-3 entry is the above-mentioned entry 6_6.

The switch 10 forwards the packet 6_6 via the port Port1_1 of the entry 6_6, and the packet 6_6 eventually arrives at the host 1, realizing that the host 4 accesses to the host 1 through the layer-3.

The above is the description of the mutual accessing between the host 4 and the host 1 on the layer-3.

For example, the host 2 accesses to the host 3 on the layer-3.

As shown in FIG. 3, the switch 10 receives a layer-3 (network layer) packet 7_7 via the Port2_2. The packet 7_7 is sent from the host 2 to the host 3, a source IP address and a destination address of the packet 7_7 are IP2_2 and IP3_3 respectively.

The MDC2_2 to which the Port2_2 belongs and the VRF1_1 to which the packet 7_7 belongs are mapped to a new VRF. For convenience of description, the VRF mapped to the MDC2_2 and the VRF1_1 is denoted as VRF3_3.

The switch 10 finds a layer-3 entry which is stored in the Chip 1_1 and matches the VRF3_3 and a destination IP address IP3_3 of the packet 7_7. For convenience of description, the layer-3 entry matching the VRF3_3 and the destination IP address IP3_3 of the packet is denoted as entry 7_7 herein.

When the entry 7_7 being stored in the Chip1_1 is found, the packet 7_7 may be forwarded directly based on the entry 7_7. The packet 7_7 can be forwarded to the host 3.

When none of layer-3 entries stored in the Chip1_1 matches with the source IP address IP2_2 of the packet 7_7 and the VRF3_3, the layer-3 entry matching the source IP address IP2_2 of the packet 7_7 and the VRF 3_3 is learned based on the Port2_2 receiving the packet 7_7 and the source IP address IP2_2 of the packet 7_7. For convenience of description, the layer-3 entry matching the IP2_2 and the VRF3_3 is denoted as entry 8_8 herein. Table 6 illustrates the entry 8_8 by exemplifying the layer-3 entry as a unicast routing entry.

TABLE 6

| VRF3_3 | IP2_2 | Port2_2 |
| --- | --- | --- |

Then when the host 3 is to access to the host 2 on the layer-3, the switch receives a layer-3 packet 8_8 via the Port3_3. The packet 8_8 is sent from the host 3 to the host 2, a source IP address and a destination IP address of the packet 8_8 are IP3_3 and IP2_2 respectively.

The MDC 2_2 to which the Port 3_3 belongs and the VRF1_1 to which the packet 8_8 belongs are mapped to a VRF by the switch 10. The new mapped VRF is the above-mentioned VRF3_3.

The switch 10 searches for the layer-3 entry which is stored in the Chip1_1 and matches the VRF3_3 and the destination IP address IP2_2 of the packet. The layer-3 entry is the above-mentioned entry 8_8.

The switch 10 forwards the packet 8_8 via the port Port2_2 of the entry 8_8, and the packet 8_8 eventually arrives at the host 2, realizing that the host 3 accesses the host 2.

The above are the description of the mutual accessing between the host 3 and the host 2 on the layer-3.

In the above description, the MDC configurations of the MDC1_1 including the entry 5_5 and the entry 6_6 and the MDC configurations of the MDC2_2 including the entry 7_7 and the entry 8_8 are stored in the Chip1_1, but the layer-3 packets, belonging to the same VRF and to be forwarded separately by different MDCs, can be identified by the Chip1_1 based on entries mapped to different new VRFs, and may not be forwarded across MDCs.

In the present disclosure, the MDC configurations may also include a Qos ACL (QACL). When a packet is received by a switch via a port, the QACL for performing access control may be found in a chip where the port is located, and then the access control is performed on the packet based on the found QACL.

In the present disclosure, the QACL may be a port mode, or a VLAN mode, or a global mode. When the QACL is the port mode, the MDCs are virtualized based on ports, and the matching QACL may be found based on the port receiving a packet. When the QACL is the VLAN mode, it is similar to the description of the above-mentioned mapped VSI. Here, based on an ID of an MDC to which the port receiving a packet belongs and an ID of the VLAN, a VSI may be determined first, and the QACL matching with the VSI and stored in the chip where the port locates is found. When the QACL is the global mode, the matching QACL stored in the chip may be found based on a Port Class ID assigned to the MDC to which the port receiving a packet belongs. In the present disclosure, different Port Class IDs may be pre-assigned to different MDCs, and the Port Class IDs assigned to the MDCs match the QACLs of the MDCs. By assigning the Port Class IDs to the MDCs, packets may be prevented from matching the global QACLs of different MDCs.

In the present disclosure, the global resources of a chip and the above-mentioned VRFs are limited. When a plurality of MDCs is in process, resources need to be managed and allocated. For example, the resources may be dynamically distributed in such a manner of first using and first occupying; or a part of resources is pre-distributed to each MDC, and each MDC uses resources within its distributed resource range, which is not limited hereto in the present disclosure.

The method provided in the present disclosure is described above. A device provided in the present disclosure will be described below.

Figure 4:
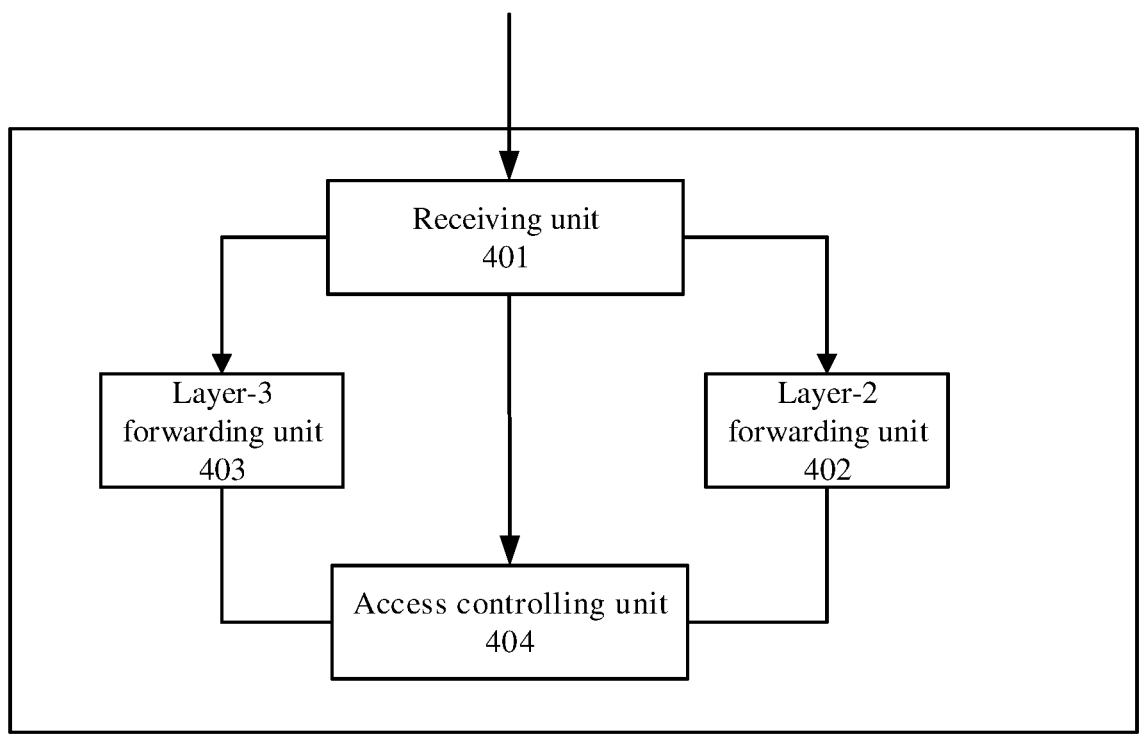
FIG. 4 illustrates a schematic structure diagram of a switch based on the present disclosure.

FIG. 4 illustrates a structure diagram of a switch according to the present disclosure. The switch includes the following units.

A receiving unit 401 is configured to receive a packet via a port.

A layer-2 forwarding unit 402 is configured to, when the packet is a layer-2 packet, determine a Virtual Switch Instance (VSI) based on an ID of a MDC to which the port belongs and an ID of a Virtual Local Area Network (VLAN) to which the packet belongs, search for a layer-2 entry stored in a chip where the port is located and matching with the VSI and a destination Media Access Control (MAC) address of the packet, and forward the packet based on the matching layer-2 entry.

A layer-3 forwarding unit 403 is configured to, when the packet is a layer-3 packet, determine a second VPN Routing and Forwarding instance (VRF) based on the ID of the MDC to which the port belongs and an ID of a first VRF to which the packet belongs, search for a layer-3 entry stored in the chip where the port is located and matching with the second VRF and a destination Internet Protocol (IP) address of the packet, and forward the packet according to the matching layer-3 entry.

In an example, the layer-2 forwarding unit 402 further learns a layer-2 entry matching with a source MAC address of the packet and the VSI and records the learned layer-2 entry on the chip.

In an example, the layer-3 forwarding unit 403 further learns a layer-3 entry matching with the second VRF and a source IP address of the packet and records the learned layer-3 entry on the chip.

As shown in FIG. 4, the device further includes:

an access controlling unit 404 configured to search for a QACL stored in the chip and matching with the port, and perform access control on the packet according to the found QACL.

The access controlling unit 404 searches for the QACL matching with the port, which specifically includes: searching for a QACL stored in the chip and matching with the VSI, or searching for a QACL stored in the chip based on a Port Class ID assigned to the MDC to which the port belongs.

Figure 5:
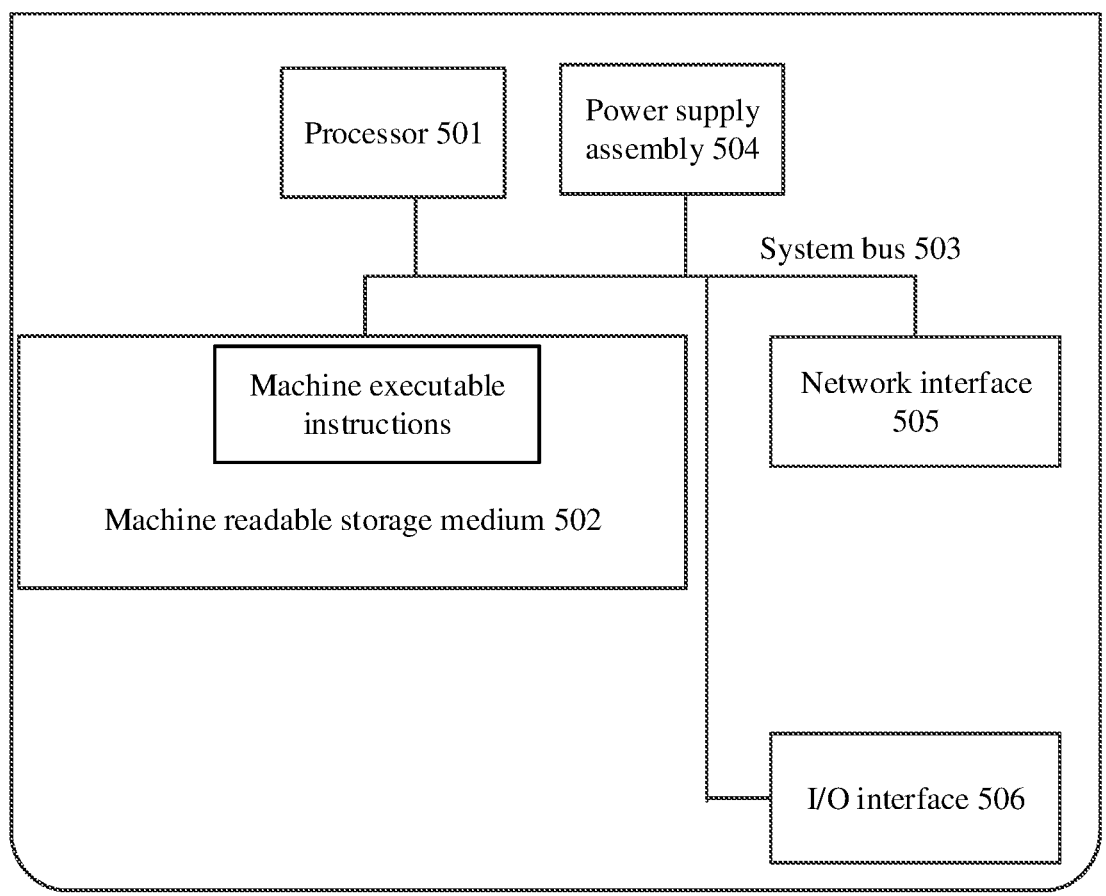
FIG. 5 illustrates a schematic structure diagram of the switch shown in FIG. 4 based on the present disclosure.

FIG. 5 illustrates a structure diagram of a switch based on the present disclosure. The switch includes: a processor 501 and a machine readable storage medium 502 that stores machine executable instructions. The processor 501 and the machine readable storage medium 502 may communicate with each other via a system bus 503. Moreover, the processor 501 may execute the method of forwarding a packet described above by reading and executing the machine executable instructions corresponding to a control logic for forwarding a packet in the machine readable storage medium 502. As shown in FIG. 5, the hardware structure may also include a power supply assembly 504 configured to perform power management of the switch, a wired or wireless network interface 505 configured to connect the switch to a network, and an input/output (I/O) interface 506.

The machine-readable storage medium 502 described herein may be any electronic, magnetic, optical or other physical storage device, and may contain or store information, such as executable instructions, data and the like. For example, the machine-readable storage medium may be a Random Access Memory (RAM), a volatile memory, a nonvolatile memory, a flash memory, a storage drive (e.g. hard disk drive), a solid state hard disk, any type of storage disk.

The machine-readable storage medium 502 is configured to store machine executable instructions corresponding to the control logic for forwarding the packet, the machine executable instructions including program instructions run by the receiving unit 401, program instructions run by the layer-2 forwarding unit 402, program instructions run by the layer-3 forwarding unit 403, and program instructions run by the access controlling unit 404.

For example, when the processor 501 reads and executes the machine executable instructions stored in the machine readable storage medium 502, the processor 501 is caused to:

receive a packet via a port;

when the packet is a layer-2 packet, determine a Virtual Switch Instance (VSI) based on an ID of a Multitenant Devices Context (MDC) to which the port belongs and an ID of a Virtual Local Area Network (VLAN) to which the packet belongs;

search for a layer-2 entry stored in a chip where the port is located and matching with the VSI and a destination Media Access Control (MAC) address of the packet, and forward the packet based on the matching layer-2 entry;

when the packet is a layer-3 packet, determine a second VPN Routing and Forwarding instance (hereinafter referred to as VRF) based on the ID of the MDC to which the port belongs and an ID of a first VRF to which the packet belongs;

search for a layer-3 entry stored in the chip and matching with the second VRF and a destination Internet Protocol (IP) address of the packet, and forward the packet based on the matching layer-3 entry.

In another example of the present disclosure, the processor 501 is further caused by the machine executable instructions to:

learn a layer-2 entry matching with a source MAC address of the packet and the VSI, and record the learned layer-2 entry on the chip.

In another example of the present disclosure, the processor 501 is further caused by the machine executable instructions to:

learn a layer-3 entry matching with the second VRF and a source IP address of the packet and record the learned layer-3 entry on the chip.

In another example of the present disclosure, the processor 501 is further caused by the machine executable instructions to:

search for a Quality-of-Service Access Control List (QACL) stored in the chip and matching with the port, and perform access control on the packet based on the found QACL.

In another example of the present disclosure, when searching for the QACL matching with the port, the processor 501 is further caused by the machine executable instructions to:

search for a QACL stored in the chip and matching with the VSI, or search for a QACL stored in the chip based on a Port Class ID assigned to the MDC to which the port belongs.

By reading and executing the machine executable instructions stored in the machine readable storage medium 502 by the processor 501, the above described method for forwarding a packet may be achieved.

The above are descriptions of the examples of the present disclosure, and not intended to limit the present disclosure. Any modifications, equivalent substitutions, adaptations thereof made without departing from the spirit and scope of the present disclosure shall be encompassed in the scope of protection of the present disclosure.

The invention claimed is:

1. A method of forwarding a packet, comprising:
   receiving, by a switch, a packet via a port on a chip on which at least two ports including the receiving port are in a same Virtual Local Area Network (VLAN) but belong to different Multitenant Devices Contexts (MDCs), wherein, the MDCs are logical devices virtualized from a physical device;
   when the packet is a layer-2 packet, determining, by the switch, a Virtual Switch Instance (VSI) based on an identification (ID) of a MDC to which the port belongs and an ID of a VLAN to which the packet belongs, searching, by the switch, for a layer-2 entry stored in a chip where the port is located and matching with the VSI and a destination Media Access Control (MAC) address of the packet, and forwarding, by the switch, the packet based on the matching layer-2 entry; and
   when the packet is a layer-3 packet, determining, by the switch, a second VPN Routing and Forwarding instance (VRF) based on the ID of the MDC to which the port belongs and an ID of a first VRF to which the packet belongs, searching, by the switch, for a layer-3 entry stored in the chip where the port is located and matching with the second VRF and a destination Internet Protocol (IP) address of the packet, and forwarding, by the switch, the packet based on the matching layer-3 entry.

2. The method according to claim 1, further comprising:
   when none of layer-2 entries stored in the chip matches with the VSI and a source MAC address of the packet, learning, by the switch, a layer-2 entry matching with the source MAC address of the packet and the VSI and recording the learned layer-2 entry on the chip.

3. The method according to claim 1, further comprising:
   when none of layer-3 entries stored in the chip matches with the second VRF and a source IP address of the packet, learning, by the switch, a layer-3 entry matching with the second VRF and the source IP address of the packet and recording the learned layer-3 entry on the chip.

4. The method according to claim 1, further comprising:
   searching, by the switch, for a Quality-of-Service Access Control List (QACL) stored in the chip and matching with the port; and performing, by the switch, access control on the packet based on the found QACL.

5. The method according to claim 4, wherein searching for the QACL matching with the port comprises:
   searching, by the switch, for a QACL stored in the chip and matching with the VSI.

6. The method according to claim 4, wherein searching for the QACL matching with the port comprises:
   searching, by the switch, for a QACL stored in the chip based on a Port Class ID assigned to the MDC to which the port belongs.

7. A switch, comprising:
   a processor and a non-transitory machine readable storage medium stored with machine executable instructions which are executable by the processor to:
   receive a packet via a port on a chip on which at least two ports including the receiving port are in a same Virtual Local Area Network (VLAN) but belong to different Multitenant Devices Contexts (MDCs), wherein, the MDCs are logical devices virtualized from a physical device;
   when the packet is a layer-2 packet, determine a Virtual Switch Instance (VSI) based on an identification (ID) of a MDC to which the port belongs and an ID of a VLAN to which the packet belongs;
   search for a layer-2 entry stored in a chip where the port is located and matching with the VSI and a destination Media Access Control (MAC) address of the packet, and forward the packet based on the matching layer-2 entry;
   when the packet is a layer-3 packet, determine a second VPN Routing and Forwarding instance (VRF) based on the ID of the MDC to which the port belongs and an ID of a first VRF to which the packet belongs;
   search for a layer-3 entry stored in the chip where the port is located and matching with the second VRF and a destination Internet Protocol (IP) address of the packet, and forward the packet based on the matching layer-3 entry.

8. The switch according to claim 7, wherein the processor is further caused by the machine executable instructions to:

when none of layer-2 entries stored in the chip matches with the VSI and a source MAC address of the packet, learn a layer-2 entry matching with the source MAC address of the packet and the VSI and record the learned layer-2 entry on the chip.

9. The switch according to claim 7, wherein the processor is further caused by the machine executable instructions to:

when none of layer-3 entries stored in the chip matches with the second VRF and a source IP address of the packet, learn a layer-3 entry matching with the second VRF and the source IP address of the packet and record the learned layer-3 entry on the chip.

10. The switch according to claim 7, wherein the processor is further caused by the machine executable instructions to:

search for a Quality-of-Service Access Control List (QACL) stored in the chip and matching with the port, and perform access control on the packet according to the found QACL.

11. The switch according to claim 10, wherein when searching for the QACL matching with the port, the processor is further caused by the machine executable instructions to:

search for a QACL stored in the chip and matching with the VSI.

12. The switch according to claim 10, wherein when searching for the QACL matching with the port, the processor is further caused by the machine executable instructions to:

search for a QACL stored in the chip based on a Port Class ID assigned to the MDC to which the port belongs.

* * * * *